United States Patent
Jeon

[11] Patent Number: 5,998,059
[45] Date of Patent: Dec. 7, 1999

[54] CYLINDRICAL BATTERY EMPLOYING A SEPARATOR HAVING A PROTRUDING PART

[75] Inventor: Byong-hee Jeon, Suwon, Rep. of Korea

[73] Assignee: Samsung Display Devices Co., Ltd., Kyungki-do, Rep. of Korea

[21] Appl. No.: 08/999,392

[22] Filed: Dec. 29, 1997

[30] Foreign Application Priority Data

Dec. 31, 1996 [KR] Rep. of Korea ............ 96-80192

[51] Int. Cl.⁶ ................................................ H01M 2/18
[52] U.S. Cl. ........................ 429/94; 429/143; 429/247
[58] Field of Search ............... 429/94, 143, 247; H01M 2/18

[56] References Cited

U.S. PATENT DOCUMENTS

| | | | |
|---|---|---|---|
| 963,216 | 7/1910 | Flanders | 429/143 |
| 4,539,273 | 9/1985 | Goebel | 429/94 |
| 5,445,906 | 8/1995 | Hobson et al. | 429/94 X |
| 5,478,362 | 12/1995 | Oota et al. | 429/143 X |
| 5,593,462 | 1/1997 | Gueguen et al. | 429/94 X |

FOREIGN PATENT DOCUMENTS 3922217  1/1991  Germany.

*Primary Examiner*—Stephen Kalafut
*Attorney, Agent, or Firm*—Leying, Voit & Mayer, Ltd.

[57] ABSTRACT

A battery electrode separator having a protrusion includes a rectangular band and a protruding part with a width and height at one end of and transverse to the band. A cylindrical alkaline battery employs the separator. Since the separator having a protrusion is made of a flexible material, such as a nonwoven fabric or a porous resin film, anode and cathode plates are not damaged during beading and crimping processes in manufacturing the battery. Thus, inferiority and lower performance of a battery can be prevented. Since an additional process for inserting the upper insulator is not required, the manufacturing process if simplified, lowering manufacturing costs.

6 Claims, 3 Drawing Sheets

SEPARATOR
CATHODE
ANODE

CYLINDRICAL BATTERY EMPLOYING A SEPARATOR HAVING A PROTRUDING PART

BACKGROUND OF THE INVENTION

The present invention relates to a secondary battery, and, more particularly, to a separator having a protrusion which is obtained by modifying the shape of the conventional separator and that also functions as an upper insulator, and a cylindrical secondary battery employing the same.

FIG. 1 is a sectional view of a general cylindrical secondary battery, and FIG. 2 is a sectional view showing only the cap assembly of the cylindrical secondary battery. As shown in FIGS. 1 and 2, a cylindrical secondary battery has a structure in which a roll of cathode and anode plates 16 and 17 with a separator 18 therebetween is placed in a cylindrical metal can 10. Also, upper and lower insulators 15 and 20 for supporting and fixing the roll and for insulating the roll from the bottom of the metal can 10 or cap portion are installed at the upper and lower portions of the roll. A cap 11 having a rubber-vent 12 therein and a cap cover 13 are installed on the upper insulator 15. Cap cover 13 is electrically connected to the cathode plate 16 via a tab 21. Also, a gasket 14 is installed around the sealing portion between the cap 11 and the cap cover 13, supporting and fixing the cap and the cap cover 13.

The assembly process of the cylindrical secondary battery having the above structure is as follows. First, the lower insulator 20 is inserted to the bottom of the cylindrical metal can 10 parallel to the bottom surface, and then the roll of cathode and anode plates 16 and 17 having the separator 18 therebetween is inserted therein. Thereafter, a flat upper insulator 15 having a through hole in the center is put on the roll. Next, a beading process is performed and then a gasket 14 is inserted. The gasket 14 prevents leakage of electrolyte, thereby protecting the battery. Then, a cap assembly including the cap 11, the cap cover 13 and the rubber-vent 12 is seated on the upper end of the metal can. Then, the metal can 10 is crimped and pressed to complete the cylindrical secondary battery.

However, in the manufacture of the cylindrical secondary battery, since the flat upper insulator having a through hole in the center is formed of a hard synthetic resin such as polyvinyl chloride (PVC) or polypropylene (PP), the roll of anode and cathode plates may be damaged by the inner wall of cylindrical metal can when the metal can is crushed during the beading, crimping, and pressing processes, which lowers the performance of a resultant battery.

SUMMARY OF THE INVENTION

It is an objective of the present invention to provide a separator having a protrusion, so as to be served as an upper insulator as well.

It is another objective of the present invention to provide a cylindrical secondary battery employing the separator having a protrusion.

According to an aspect of the present invention, there is provided a separator having a protrusion including a main part which is shaped into a breadthwise long band and a protruding part with a predetermined width and height on a corner of one lengthwise end of the main part.

According to another aspect of the present invention, there is provided a cylindrical secondary battery including a metal can, a roll of anode and cathode plates having a separator intervened therebetween which is inserted in the metal can, a cap assembly seated on the roll, wherein the separator is projected from the outermost circumference of the roll to serve as an upper insulator as well.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

According to the present invention, in the separator having a protrusion, the width of the protruding part is $2\pi r$, where r is the radius of the roll to be formed of anode and cathode plates and the separator, and the height thereof is equal to the distance from the wall of a metal can to an anode tab in a battery to which the separator is to be applied.

Preferably, the separator having a protrusion is made of a flexible material. As the flexible a nonwoven fabric or a porous resin film can be used.

Figure 1:
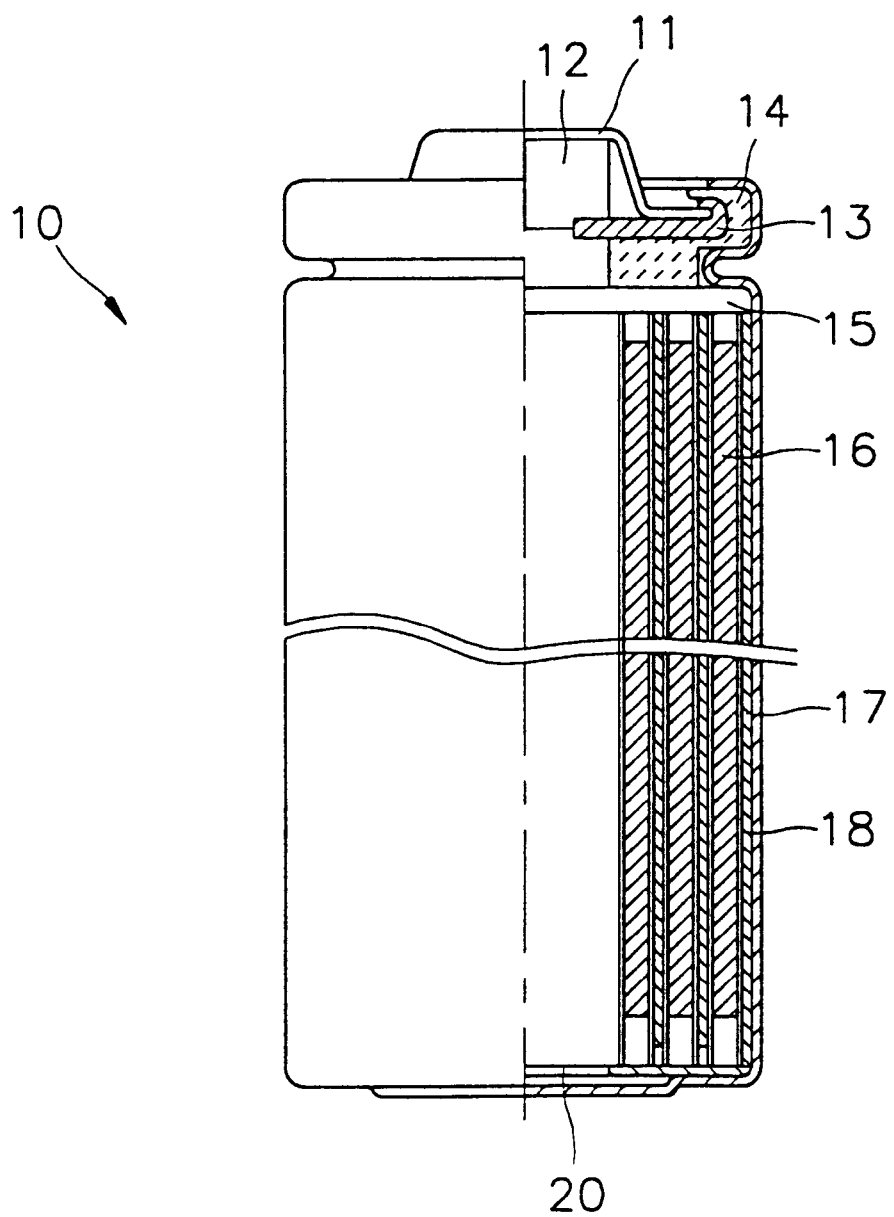
FIG. 1 is a partial sectional view of a common type of cylindrical secondary battery.
Figure 2:
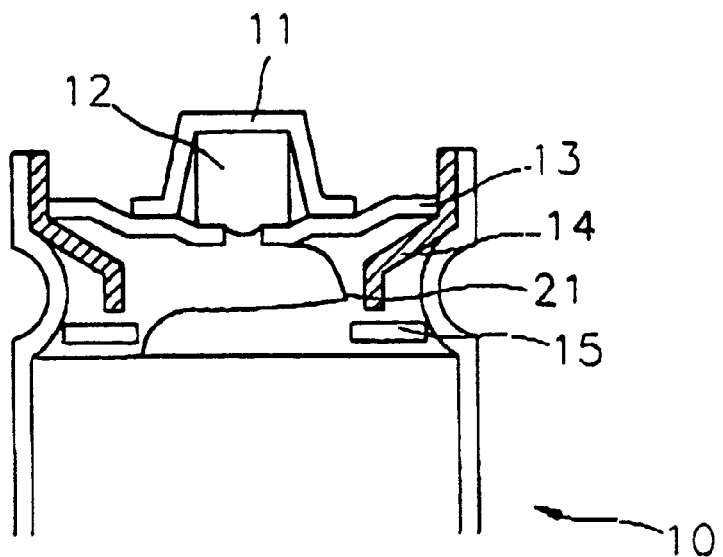
FIG. 2 is a partial sectional view of a cap assembly including an conventional upper insulator.
Figure 3:
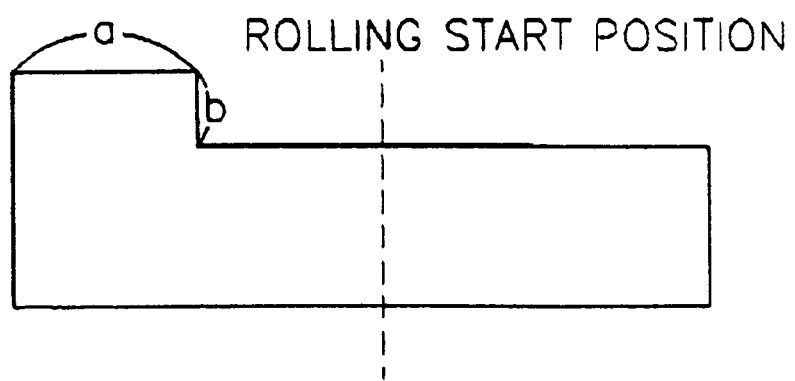
FIG. 3 is a plan view of a separator having a protrusion according to the present invention.

FIG. 3 is a plan view of the separator having a protrusion according to the present invention. As shown in FIG. 3, the separator having a protrusion includes a main part with a width ("a" in FIG. 3) and height ("b" in FIG. 3) on one end of the top surface of the main part. Here, as mentioned above, "a" is $2\pi r$, where r is the radius of the roll to be formed of anode and cathode plates and the separator, and "b" is equal to the distance from the wall of a metal can to an anode tab in a battery to which the separator is to be applied.

Figure 4A:
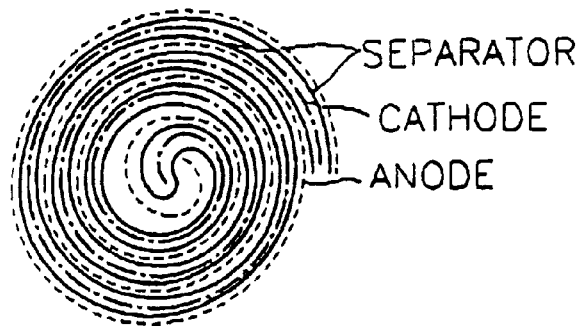
FIGS. 4A and 4B are cross-sectional and perspective views of a roll of anode and cathode plates having the separator including a protrusion therebetween.
Figure 4B:
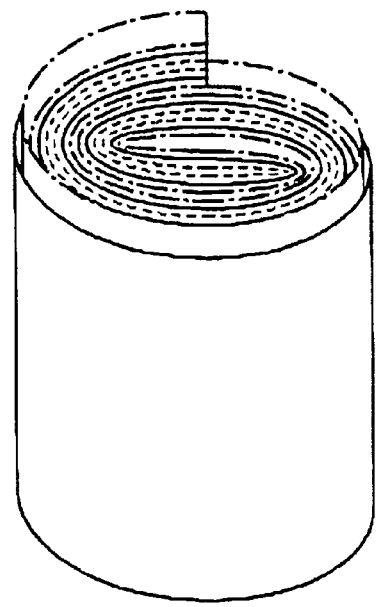

The separator having a protrusion is interposed between the anode and cathode plates, and then rolled from the center thereof (see FIG. 3) to obtain a roll as shown in FIGS. 4A and 4B. The roll has a shape in which the separator protrudes from the outermost circumference of the roll by a height ("b" in FIG. 3).

Figure 5:
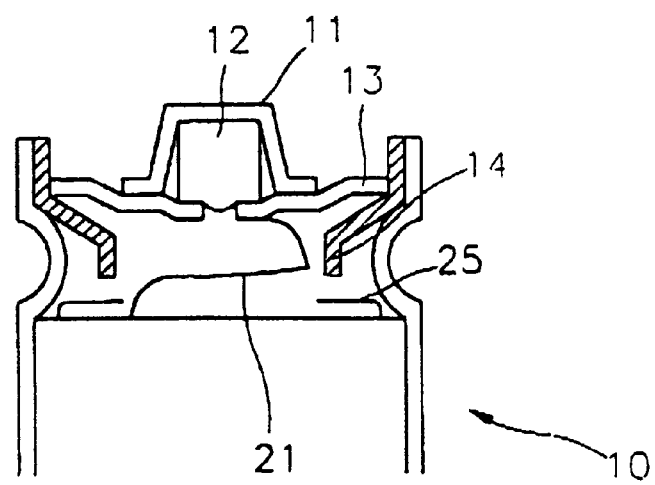
FIG. 5 is a sectional view of a cap assembly including the roll of anode and cathode plates having the separator with a protrusion therebetween shown in FIG. 4.

FIG. 5 is a sectional view showing the cap assembly of the cylindrical secondary battery employing the separator having a protrusion according to the present invention. As can be seen from FIG. 5, after the roll is inserted into the metal can 10, a beading process is performed and then the open upper end of the metal can is covered with a gasket 14. Next, a cap assembly including a cap 11, a cap cover 13 and a rubber-vent 12 is placed thereon, and then crimping and pressing processes are performed to complete the battery. Here, the protruding part 25 of separator having a protrusion is folded toward the center axis of the battery during the beading, crimping, and pressing processes, so that it functions as an upper insulator, as well as a separator.

EFFECT OF THE INVENTION

Since the separator having a protrusion is made of a flexible material, such a nonwoven fabric or a porous resin film, anode and cathode plates are prevented from being damaged during the beading and crimping processes. Thus, inferiority and lower performance of battery can be prevented. Also, since an additional process for inserting the upper insulator is not required, the manufacturing process is simplified, lowering manufacturing costs.

What is claimed is:

1. A cylindrical secondary battery comprising:

a tubular metal can;

a rolled electrode assembly including rectangular anode and cathode plates and a separator interposed between the anode and cathode plates, the separator including a main part having dimensions and a rectangular shape equal to those of the rectangular anode and cathode plates, and a rectangular protruding part extending from only part of a side of the main part as a cylindrical protruding part of the rolled electrode assembly and having a circumference substantially equal to that of the rolled electrode assembly, wherein the rolled electrode assembly is disposed inside the tubular metal can;

a central electrode tab protruding from the anode plate of the rolled electrode assembly; and a cap assembly seated on the tubular metal can.

2. The cylindrical secondary battery of claim 1, wherein the protruding part extends from the anode and cathode plates by a distance equal to a distance from a wall of the cylindrical metal can to the anode tab.

3. The cylindrical secondary battery of claim 2, wherein the tubular metal can has a radius r and the protruding part has a length along the side of the main part equal to $2\pi r$.

4. The cylindrical secondary battery as claimed in claim 1, wherein the separator is one of a nonwoven fabric and a porous resin film.

5. The cylindrical secondary battery as claimed in claim 1, wherein the tubular metal can has a radius r and the protruding part has a length along the side of the main part equal to $2\pi r$.

6. The cylindrical secondary battery as claimed in claim 1, wherein the protruding part is folded transverse to the rolled electrode assembly.

* * * * *